(12) United States Patent
Kasslin et al.

(10) Patent No.: US 9,148,840 B2
(45) Date of Patent: Sep. 29, 2015

(54) BEACONING MODE FOR WIRELESS COMMUNICATION

(71) Applicant: Nokia Corporation, Espoo (FI)

(72) Inventors: Mika Kasslin, Espoo (FI); Mikko Tirronen, Helsinki (FI); Kari Leppanen, Helsinki (FI); Sami Virtanen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/157,114

(22) Filed: Jan. 16, 2014

(65) Prior Publication Data

US 2014/0161107 A1 Jun. 12, 2014

Related U.S. Application Data

(63) Continuation of application No. 12/396,834, filed on Mar. 3, 2009.

(51) Int. Cl.
*H04B 7/00* (2006.01)
*H04W 40/24* (2009.01)
*H04W 48/12* (2009.01)
*H04W 56/00* (2009.01)

(52) U.S. Cl.
CPC ............ *H04W 40/244* (2013.01); *H04W 48/12* (2013.01); *H04W 56/001* (2013.01)

(58) Field of Classification Search
CPC ...... H04W 88/02; H04W 88/04; H04W 88/06
USPC .................. 370/310, 311, 342, 343, 345, 349
See application file for complete search history.

(56) References Cited

U.S. PATENT DOCUMENTS

| 5,371,734 | A | 12/1994 | Fischer | |
|---|---|---|---|---|
| 6,941,372 | B2 | 9/2005 | Pearson | |
| 7,567,673 | B2 | 7/2009 | Fukuzawa et al. | |
| 7,590,100 | B2 | 9/2009 | Smith et al. | |
| 7,774,495 | B2 | 8/2010 | Pabla et al. | |
| 7,848,277 | B2 * | 12/2010 | Chou et al. ..................... | 370/318 |
| 7,864,720 | B2 | 1/2011 | Jeyaseelan | |
| 7,907,557 | B2 | 3/2011 | Carter | |
| 8,005,032 | B2 * | 8/2011 | Wang et al. .................... | 370/311 |

(Continued)

FOREIGN PATENT DOCUMENTS

| CN | 1809007 | 7/2006 |
|---|---|---|
| EP | 1 361 728 A2 | 11/2003 |

(Continued)

OTHER PUBLICATIONS

Frequency, Wilkipedia, Jan. 9, 2015, pp. 1-9.*

(Continued)

*Primary Examiner* — Dmitry H Levitan
(74) *Attorney, Agent, or Firm* — Locke Lord LLP

(57) ABSTRACT

Embodiments of the present invention are directed to facilitating apparatus interaction. In at least one example embodiment of the present invention, apparatuses may comprise both triggered communication activities and automated communication activities. Triggered communication activities may correspond to, for example, user and/or application instigated actions in a wireless apparatus. Automated activities may occur without any requirement for user intervention, and further, without any notification to the user that an action has occurred.

21 Claims, 8 Drawing Sheets

(56) References Cited

U.S. PATENT DOCUMENTS

| | | |
|---|---|---|
| 8,014,378 B1 | 9/2011 | Yoon et al. |
| 2002/0101446 A1 | 8/2002 | Tang et al. |
| 2003/0204742 A1 | 10/2003 | Gupta et al. |
| 2004/0153676 A1 | 8/2004 | Krantz et al. |
| 2005/0025092 A1 | 2/2005 | Morioka et al. |
| 2005/0068928 A1 | 3/2005 | Smith et al. |
| 2005/0128988 A1 | 6/2005 | Simpson et al. |
| 2005/0193106 A1 | 9/2005 | Desai et al. |
| 2006/0034217 A1 | 2/2006 | Kwon et al. |
| 2006/0215588 A1 | 9/2006 | Yoon |
| 2006/0251004 A1 | 11/2006 | Zhong et al. |
| 2007/0002811 A1 | 1/2007 | Faccin et al. |
| 2007/0086424 A1 | 4/2007 | Calcev et al. |
| 2007/0086426 A1 | 4/2007 | Bonta et al. |
| 2007/0127427 A1 | 6/2007 | Tanaka |
| 2007/0254596 A1 | 11/2007 | Corson et al. |
| 2008/0025512 A1 | 1/2008 | Nakajima |
| 2008/0125190 A1 | 5/2008 | Jan et al. |
| 2008/0130543 A1 | 6/2008 | Singh et al. |
| 2008/0151848 A1 | 6/2008 | Fischer et al. |
| 2009/0003278 A1 | 1/2009 | Abdel-Kader et al. |
| 2009/0073871 A1 | 3/2009 | Ko et al. |
| 2009/0147702 A1 | 6/2009 | Buddhikot et al. |
| 2009/0247201 A1 | 10/2009 | Ye et al. |
| 2009/0279449 A1 | 11/2009 | Kneckt et al. |
| 2009/0310571 A1 | 12/2009 | Matischek et al. |
| 2010/0110948 A1 | 5/2010 | Batta |
| 2010/0111066 A1 | 5/2010 | Mehta |
| 2010/0157827 A1 | 6/2010 | Park et al. |
| 2010/0189082 A1 | 7/2010 | Choi et al. |
| 2010/0226297 A1 | 9/2010 | Kasslin et al. |
| 2010/0226309 A1 | 9/2010 | Kasslin et al. |

FOREIGN PATENT DOCUMENTS

| | | | |
|---|---|---|---|
| EP | 1396986 | 3/2004 | |
| EP | 1545146 | 6/2005 | |
| EP | 1 684 465 | 7/2006 | |
| EP | 1684465 | * 7/2006 | ............ H04L 12/28 |
| EP | 1 703 701 A1 | 9/2006 | |
| EP | 2107732 | 10/2009 | |
| WO | WO 2004091246 | 10/2004 | |
| WO | WO 2005006658 | 1/2005 | |
| WO | WO 2008075264 | 6/2008 | |
| WO | WO 2008094107 | 8/2008 | |
| WO | WO 2009113798 | 9/2009 | |
| WO | WO2010029386 | 3/2010 | |

OTHER PUBLICATIONS

Reporting Letter with Chinese Patent Office Action for International Application No. 201080009858.4 dated Aug. 21, 2013.

International Search Report dated May 10, 2010 for International Application No. PCT/FI2010/050071.

IEEE 802.11-2007, Wireless Medium Access Control (MAC) and Physical Layer (PHY) Specifications, Jun. 2007, Chapter 7.2.3.1 entitled "Beacon Frame Format", (pp. 80-81).

International Search Report of International App. No. PCT/FI2010/050801—Date of Completion of Search: Feb. 3, 2011, 4 pages.

International Search Report of International App. No. PCT/FI2010/050803—Date of Completion of Search: Feb. 24, 2011, 4 pages.

International Search Report of International App. No. PCT/FI2010/050838—Date of Completion of Search: Jan. 21, 2011, 4 pages.

International Search Report mailed Sep. 10, 2010 in International Application Serial No. PCT/IB2010/052403, 4pp.

Wang, Q. et al., "AwareWare: An Adaptation of Middleware for Heterogeneous Environments", IEEE Communications Society, 2004, 6 pages.

Jung, E., et al., "An Energy Efficient MAC Protocol for Wireless LANs", Technical Report TR01-017, Department of Computer Science, Texas A&M University, Jul. 31, 2001, 11 pages.

Cordeiro et al, "Cognitive PHY and MAC Layers for Dynamic Spectrum Access and Sharing pf TV Bands", published by ACM on Aug. 5, 2006, 11 pp.

Cavalcanti et al., "IEEE 80222-07/0121r1: Proposed text changes to Section 6.21.2 Self-coexistence in IEEE 802.22/D0.2 Draft Standard" published Mar. 2007. 26 pp.

International Search Report mailed Jun. 4, 2010 for International Application No. PCT/FI2010/050069, 4pp.

L Wang, et al., Proposed SFD Text for 802.11ai, doc.: IEEE 11-12-0406-02-00ai; Passive Scanning Improvement, May 4, 2012; pp. 1-15.

H. Chen, et al., IEEE P802.11; doc.: IEEE 802.11-10/0828r0, Wireless LANs, Normative Text for 5 MHz Measurement Pilot Frame, Jun. 2010, pp. 1-4.

European Search Report for Application No. 10748379.4-1855 completed Jul. 29, 2014.

Chinese Office Action with Reporting Letter for Invention No. 201080009858.4 dated Sep. 9, 2014.

* cited by examiner

FIG. 7

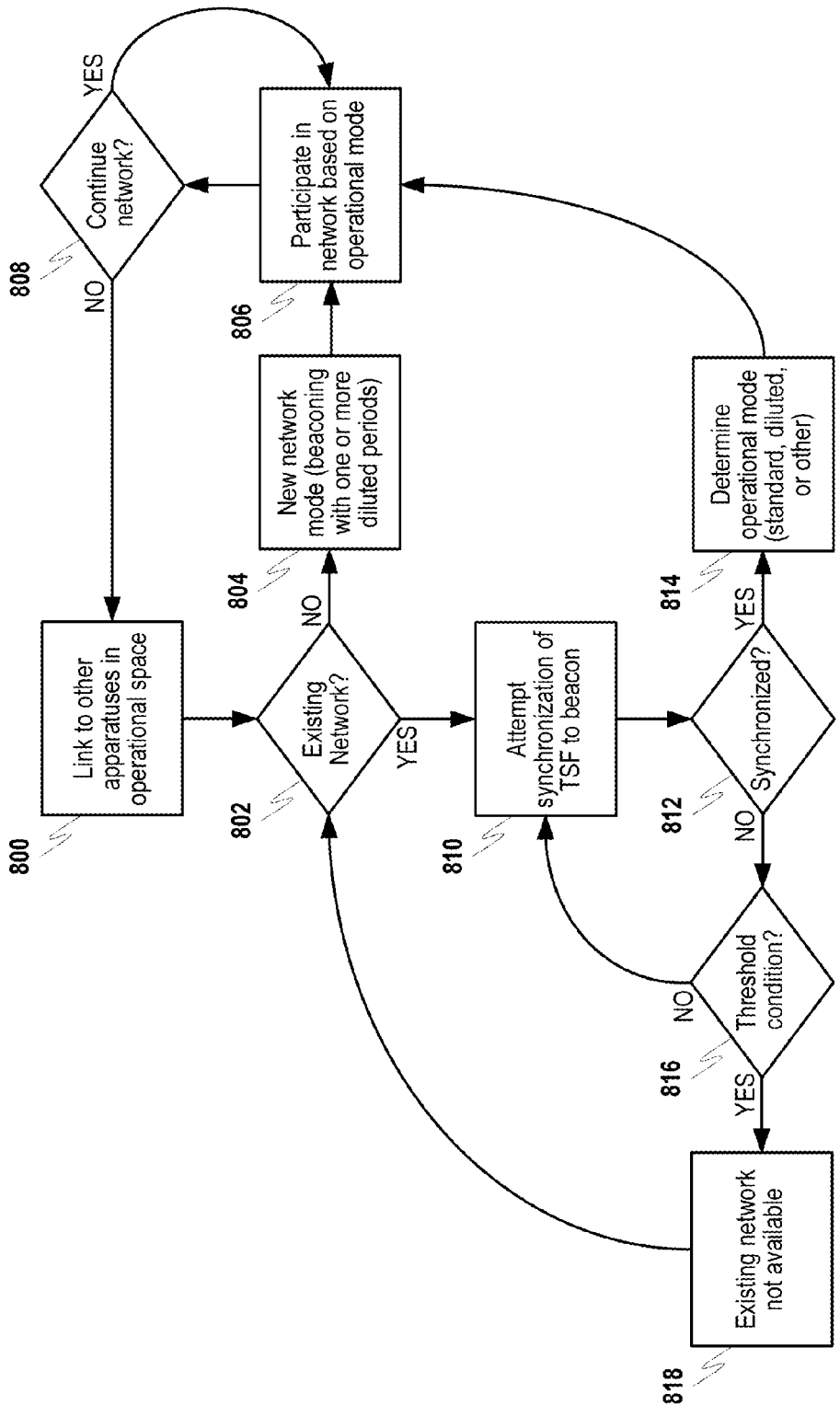

BEACONING MODE FOR WIRELESS COMMUNICATION

PRIORITY

The present U.S. patent application is a continuation of U.S. patent application Ser. No. 12/396,834, filed on Mar. 3, 2009, and claims priority under 35 U.S.C. §120. The disclosure of the above priority application is incorporated herein, in entirety, by reference.

BACKGROUND

1. Field of Invention

Various embodiments of the present invention pertain generally to wireless link establishment, and in particular, to establishing beacon periods of varying frequency.

2. Background

Wireless communication has moved from simply being concerned with conveying verbal information to being more focused on total digital interactivity. While originally limited to voice communication (e.g., telephone calls on cellular handsets), enhancements in wireless technology have substantially improved ability, quality of service (QoS), speed, etc. These developments have contributed to an insatiable desire for new functionality. Portable wireless apparatuses are no longer just tasked with making telephone calls. They have become integral, and in some cases essential, tools for managing the professional and/or personal life of users.

The effect of this evolving technology may be seen in instances where a plurality of apparatuses have been replaced with a single multifunction device. The functionality that was formally provided by landline telephones and facsimiles, laptop computers, portable digital assistants (PDA), game systems, music players, digital storage devices may be supported in a single digital communication apparatus. The above functionality may be further supplemented through the provision of applications that were not previously available in portable apparatuses (e.g., directional/tracking features, wireless financial transactions, social networking, etc.).

Such functionality, both existing and emerging, require systems and strategies for seamlessly interconnecting users. In particular, apparatus users will desire a virtually immediate response when applications or functions are executed. Any delay or inaccuracy in the response will negatively impact on a user's satisfaction with the application or function, and thus, may be detrimental to the acceptance of the application or function by the consuming public.

SUMMARY

Example embodiments of the present invention may be directed to a method, apparatus, computer program and system for facilitating apparatus interaction. In accordance with at least one example implementation, apparatuses operating within communication range of each other (e.g., in the same operational space) may interact wirelessly without user intervention. This interaction may comprise data-type information exchanges conducted over distributed local networks. Distributed local networks may establish/maintain connectivity between apparatuses without visibility from the user/application level through the use of simple low-level messaging.

In accordance with various example embodiments of the present invention, network connections may be established in accordance with protocols dictated by the particular wireless communication medium being employed. In some instances, apparatuses participating in these networks may be kept in synchronization through the use of beaconing. While a beacon may establish timing for the entire network, certain apparatuses may desire (or may be required) to be active less frequently than dictated by network beaconing. For example, apparatuses with limited resources, low messaging levels, etc. may have activity requirements substantially below the frequency established by the beacon. These apparatuses may select an operational mode that uses a beacon period that is lower than the standard beacon period, or a "diluted" beacon period.

In at least one implementation, beaconing apparatuses may also transmit one or more associated diluted beacon period indications in each beacon frame. Diluted beacon period indications may be communicated in terms of predefined information elements (IEs), and may be "associated" with a beacon in that the frequency of a diluted beacon may be expressed as a multiple of the primary beaconing period. Since diluted beacon periods are defined by the apparatus transmitting the network beacon, the operational mode of apparatuses that join the network may be established after beacon synchronization, and may further be communicated within the network so that periods where apparatuses may be contending for access to a wireless communication medium may be known to the other networked apparatuses.

The above summarized configurations or operations of various embodiments of the present invention have been provided merely for the sake of explanation, and therefore, are not intended to be limiting. Moreover, inventive elements associated herein with a particular example embodiment of the present invention can be used interchangeably with other example embodiments depending, for example, on the manner in which an embodiment is implemented.

DESCRIPTION OF DRAWINGS

The disclosure will be further understood from the following description of various exemplary embodiments, taken in conjunction with appended drawings, in which:

FIG. 7 discloses examples of various packet structures in accordance with at least one example embodiment of the present invention.

FIG. 8 discloses a flowchart for an example communication process in accordance with at least one example embodiment of the present invention.

DESCRIPTION OF EXEMPLARY EMBODIMENTS

Figure 1:
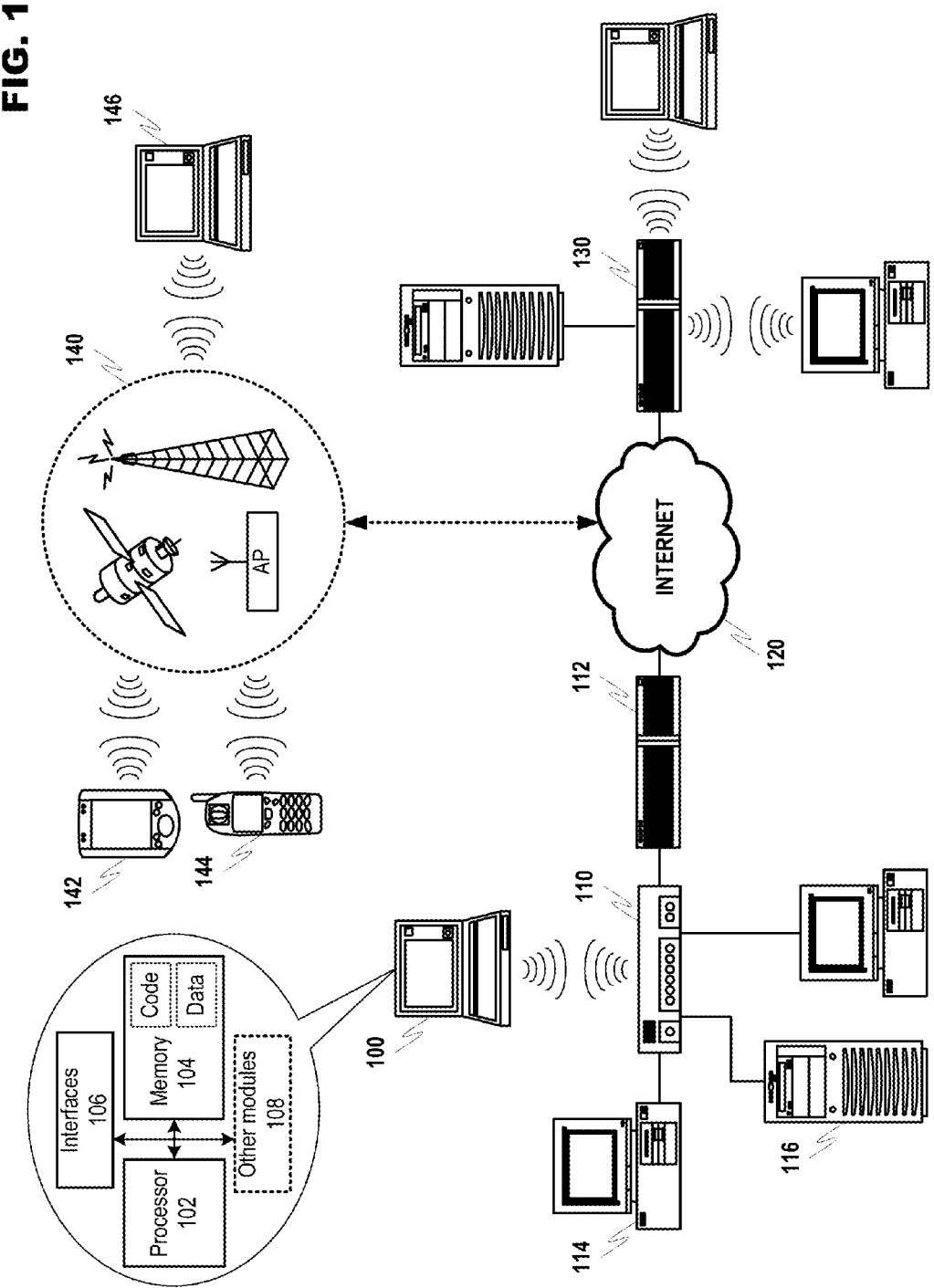
FIG. 1 discloses examples of hardware and software resources that may be utilized when implementing various example embodiments of the present invention.

While the present invention has been described herein in terms of a multitude of example embodiments, various changes or alterations can be made therein without departing from the spirit and scope of the present invention, as set forth in the appended claims.

I. General System with which Embodiments of the Present Invention May be Implemented An example of a system that is usable for implementing various embodiments of the present invention is disclosed in FIG. 1. The system comprises elements that may be included in, or omitted from, configurations depending, for example, on the requirements of a particular application, and therefore, is not intended to limit present invention in any manner.

Computing device 100 may be, for example, a laptop computer. Elements that represent basic example components comprising functional elements in computing device 100 are disclosed at 102-108. Processor 102 may include one or more devices configured to execute instructions, wherein a group of instructions may be constituted, for example, as program code. In at least one scenario, the execution of program code may include receiving input information from other elements in computing device 100 in order to formulate an output (e.g., data, event, activity, etc). Processor 102 may be a dedicated (e.g., monolithic) microprocessor device, or may be part of a composite device such as an ASIC, gate array, multi-chip module (MCM), etc.

Processor 102 may be electronically coupled to other functional components in computing device 100 via a wired or wireless bus. For example, processor 102 may access memory 102 in order to obtain stored information (e.g., program code, data, etc.) for use during processing. Memory 104 may generally include removable or imbedded memories that operate in a static or dynamic mode. Further, memory 104 may include read only memories (ROM), random access memories (RAM), and rewritable memories such as Flash, EPROM, etc. Code may include any interpreted or compiled computer language including computer-executable instructions. The code and/or data may be used to create software modules such as operating systems, communication utilities, user interfaces, more specialized program modules, etc.

One or more interfaces 106 may also be coupled to various components in computing device 100. These interfaces may allow for inter-apparatus communication (e.g., a software or protocol interface), apparatus-to-apparatus communication (e.g., a wired or wireless communication interface) and even apparatus to user communication (e.g., a user interface). These interfaces allow components within computing device 100, other apparatuses and users to interact with computing device 100. Further, interfaces 106 may communicate machine-readable data, such as electronic, magnetic or optical signals embodied on a computer readable medium, or may translate the actions of users into activity that may be understood by computing device 100 (e.g., typing on a keyboard, speaking into the receiver of a cellular handset, touching an icon on a touch screen device, etc.) Interfaces 106 may further allow processor 102 and/or memory 104 to interact with other modules 108. For example, other modules 108 may comprise one or more components supporting more specialized functionality provided by computing device 100.

Computing device 100 may interact with other apparatuses via various networks as further shown in FIG. 1. For example, hub 100 may provide wired and/or wireless support to devices such as computer 114 and server 116. Hub 100 may be further coupled to router 112 that allows devices on the local area network (LAN) to interact with devices on a wide area network (WAN, such as Internet 120). In such a scenario, another router 130 may transmit information to, and receive information from, router 112 so that devices on each LAN may communicate. Further, all of the components depicted in this example configuration are not necessary for implementation of the present invention. For example, in the LAN serviced by router 130 no additional hub is needed since this functionality may be supported by the router.

Further, interaction with remote devices may be supported by various providers of short and long range wireless communication 140. These providers may use, for example, long range terrestrial-based cellular systems and satellite communication, and/or short-range wireless access points in order to provide a wireless connection to Internet 120. For example, personal digital assistant (PDA) 142 and cellular handset 144 may communicate with computing device 100 via an Internet connection provided by a provider of wireless communication 140. Similar functionality may be included in devices, such as laptop computer 146, in the form of hardware and/or software resources configured to allow short and/or long range wireless communication.

II. Example Networking Environment

Figure 2:
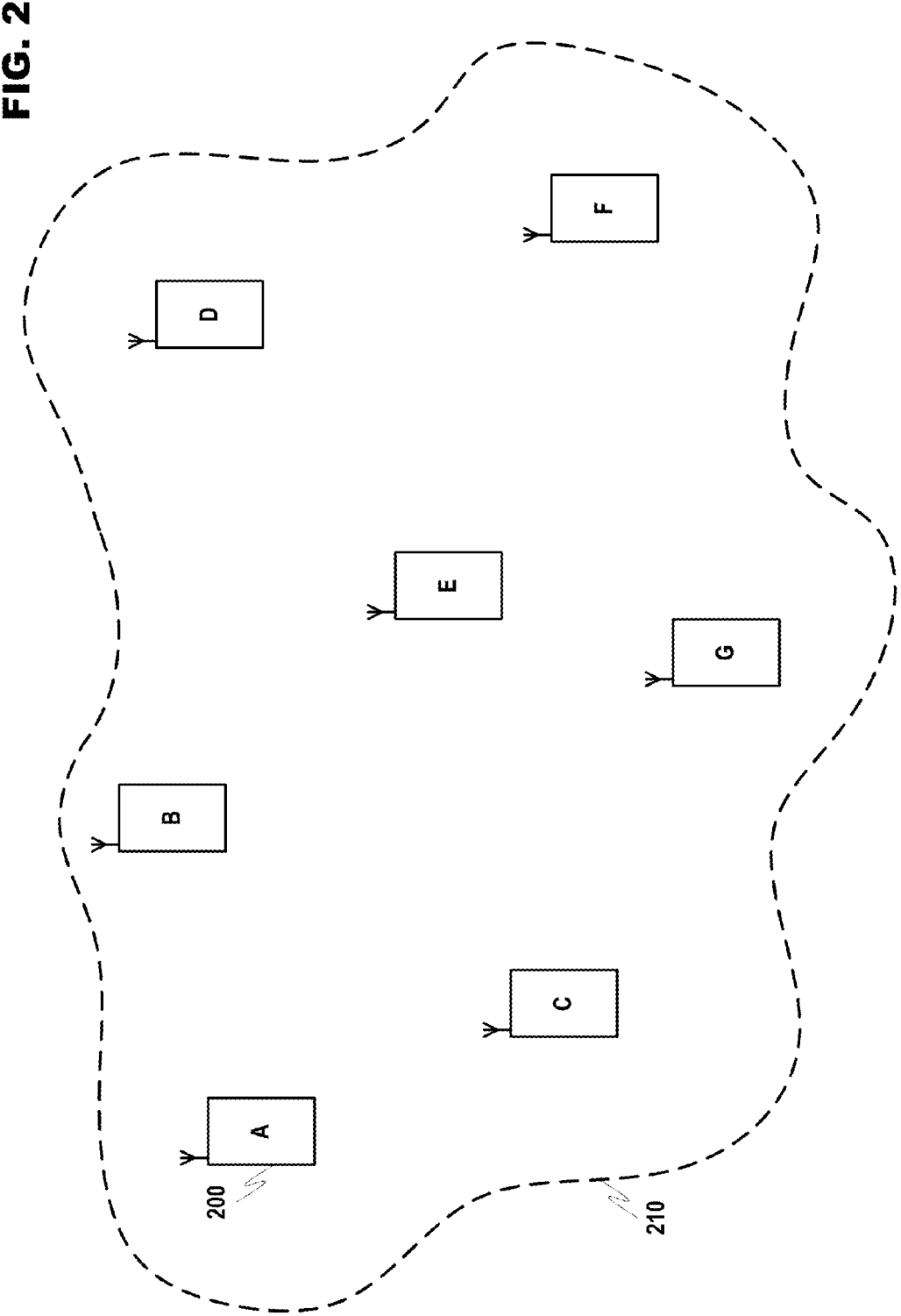
FIG. 2 discloses an example network environment in accordance with at least one example embodiment of the present invention.

FIG. 2 discloses an example operational space that will be utilized to describe various example embodiments of the present invention. The example scenario depicted in FIG. 2 is utilized herein only for the sake of explanation, and therefore, is not intended to limit the scope of the various embodiments of the present invention. Operational spaces may be defined using various criteria. For example, a physical space like a building, theatre, sports arena, etc. may be utilized to define an area in which users interact. Otherwise, operational spaces may be defined in view of apparatuses utilizing particular wireless transports, apparatuses within communication range (e.g., a certain distance) of each other, apparatuses that are in certain classes or groups, etc.

Wireless-enabled apparatuses 200 are labeled "A" to "G" in FIG. 2. Apparatuses 200 may, for example, correspond to any of the wireless-enabled apparatuses that were disclosed in FIG. 1, and may further include at least the resources discussed with respect to apparatus 100. For the sake of example herein, these apparatuses may operate utilizing at least one wireless communication medium in common. That is, all apparatuses in the example of FIG. 2 are at least able to wirelessly communicate with each other within the operational space, and therefore, may participate in the same wireless communication network.

III. Examples of Messaging

Figure 3:
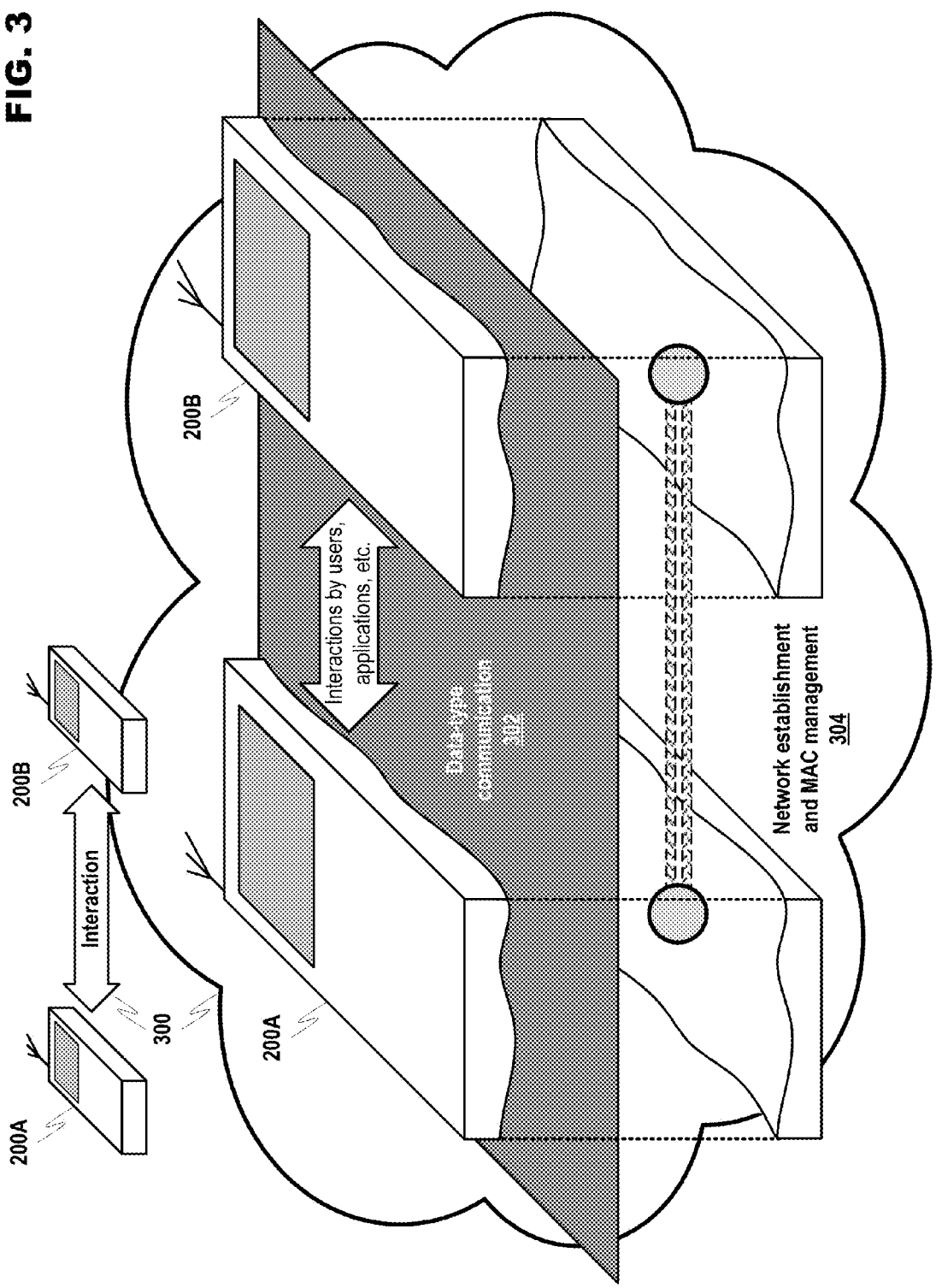
FIG. 3 discloses examples of various types of messaging that may be utilized in accordance with at least one example embodiment of the present invention.

Now referring to FIG. 3, an example of communication between apparatuses in accordance with at least one example embodiment of the present invention is disclosed at 300. While only apparatus 200A and apparatus 200B are shown, the disclosed example scenario is being utilized only for the sake of explanation herein, and is not intended to limit the scope or applicability of any embodiment of the present invention. Moreover, the various example embodiments of the present invention, such as disclosed herein, may be implemented in order to facilitate wireless interaction between two or more apparatuses existing in an operational space.

Additional detail with respect to communication example 300 is disclosed further in FIG. 3. Apparatus 200A may have communication requirements that require interaction with apparatus 200B. For example, these requirements may comprise interactions by apparatus users, applications residing on the apparatuses, etc. that trigger the transmission of messages that may be generally classified under the category of data-type communication 302. Data-type communication may be carried out using tiny messages that may be transmitted between apparatus 200A and 200B. However, some form of wireless network link or connection must first be established before any data type communication messages 302 may be exchanged.

Network establishment and MAC management messages 304 may be utilized to establish and maintain an underlying wireless network architecture within an operating space that may be utilized to convey data type communication messages 302. In accordance with various example embodiments of the present invention, messages containing apparatus configuration, operation and status information may be exchanged to transparently establish wireless network connections when, for example, an apparatus enters an operating space. Network connections may exist between any or all apparatuses existing within the operating space, and may be in existence for the entire time that an apparatus resides in the operating space. In this way, data-type communication messages 302 may be conveyed between apparatuses over already existent networks (a new network connection does not need to be negotiated at the time the message is to be sent), which may in turn reduce response delay and increase quality of service (QoS).

Figure 4:
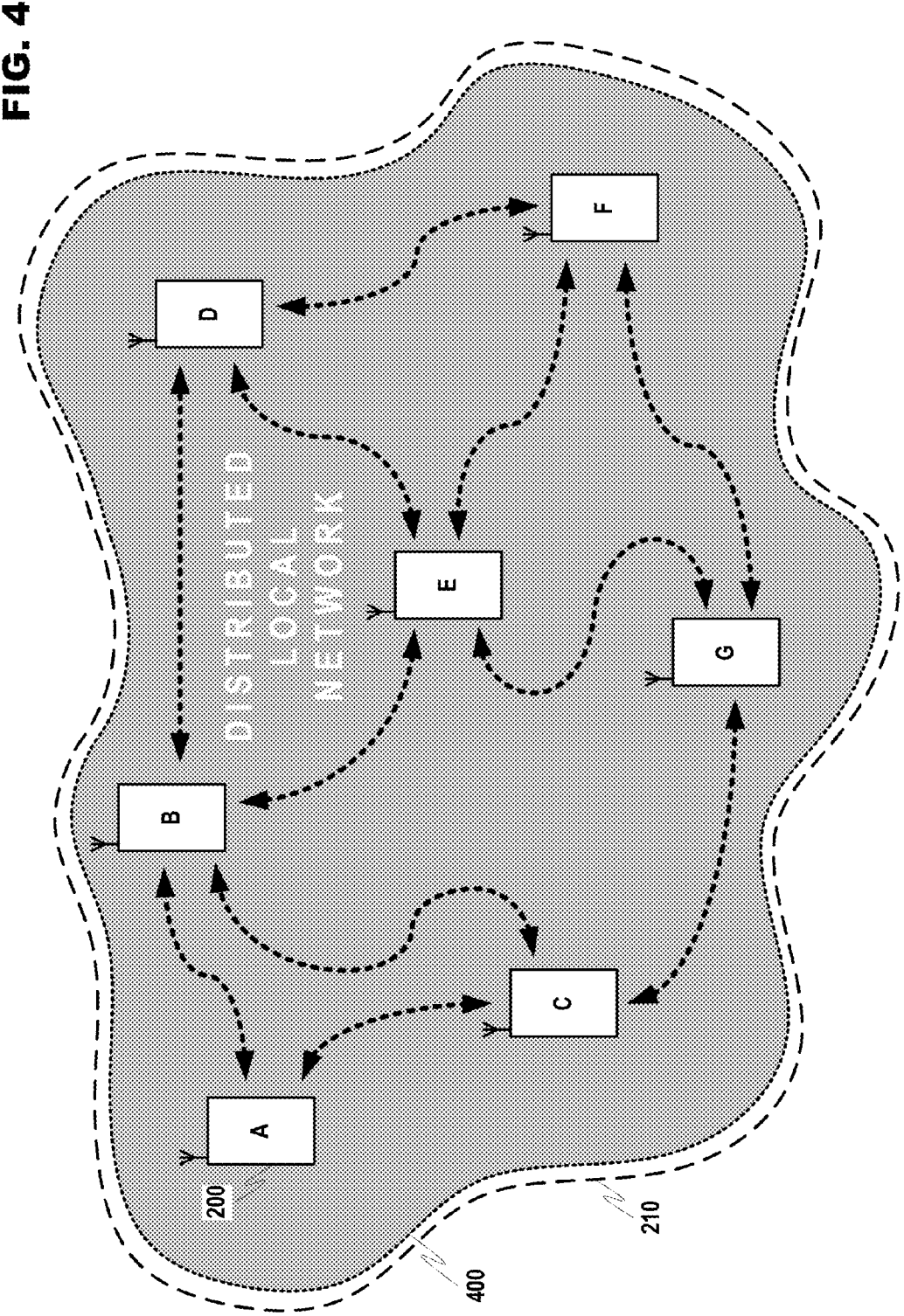
FIG. 4 discloses an example of message propagation that may result in distributed local web formation in accordance with at least one example embodiment of the present invention.

The example scenario disclosed in FIG. 2 is now revisited in FIG. 4, which shows an example of distributed local network formation utilizing automated network establishment and MAC management messages 304. Apparatuses 200 that enter into operational space 210 may immediately begin to formulate network connections through the exchange operational information. Again, the exchange of this information may occur without any prompting from, or even knowledge of, a user. An example of this interactivity is shown in FIG. 4, wherein various network establishment and MAC management messages 304 are exchanged between apparatuses A to G. In accordance with at least one example embodiment of the present invention, messages may be exchanged directly between an originating apparatus (e.g., the apparatus that is described by the information elements in a message) and a receiving apparatus. Alternatively, messages corresponding to one or more apparatuses in operational space 210 may be forwarded from one apparatus to another, thereby disseminating the information for multiple apparatuses.

IV. Example Operational Parameter: Diluted Beacon Period

Figure 5:
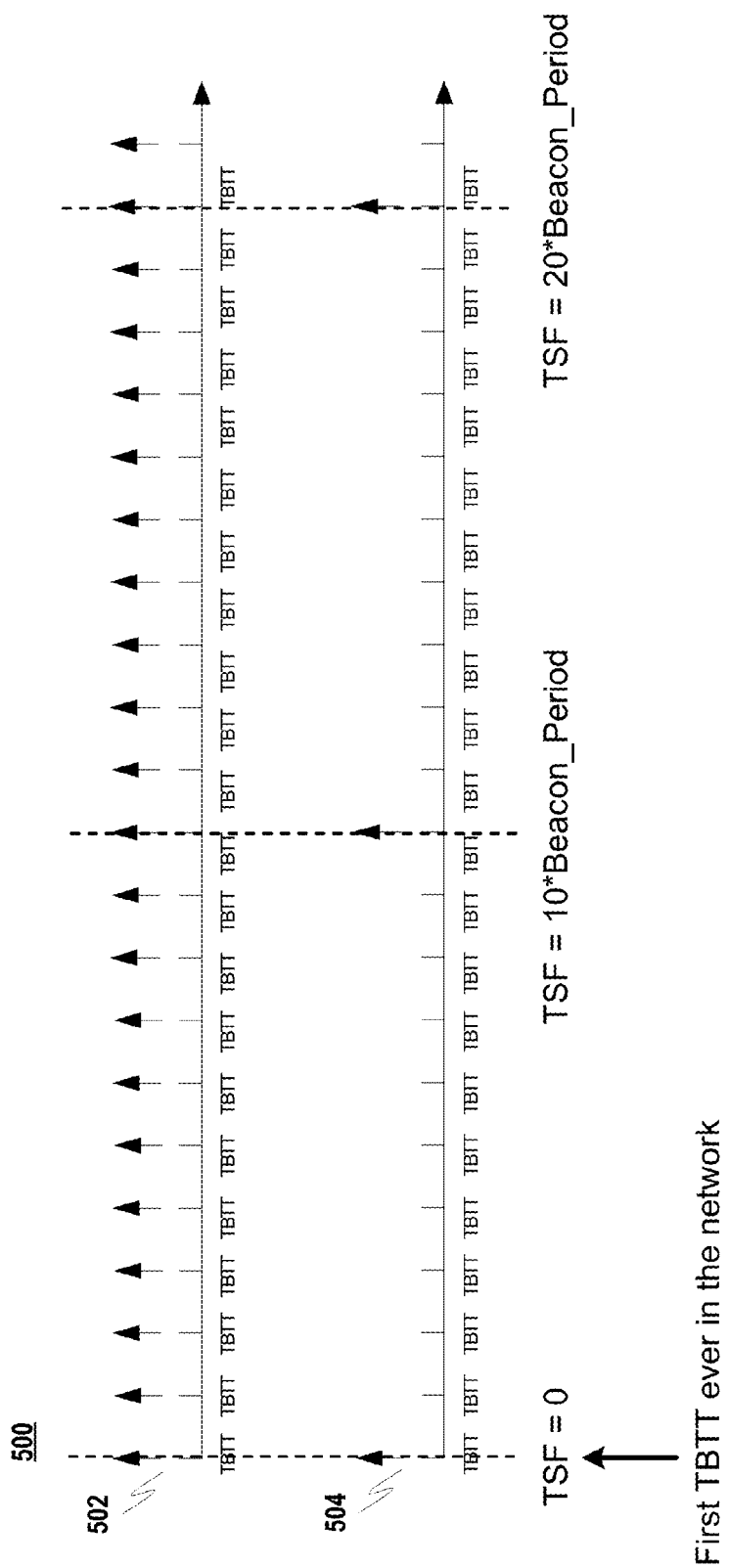
FIG. 5 discloses example beacon implementations that are usable in accordance with at least one example embodiment of the present invention.

An example of information that may be communicated in network establishment and MAC management messages 304 (e.g., through the use in an information element) is now disclosed in FIG. 5. The activity flow disclosed at 500 represents an example implementation using selected features of wireless local area networking or WLAN (as set forth in the IEEE 802.11 specification). However, various embodiments of the present invention are not strictly limited to WLAN, and thus, may be applied to various wireless network architectures using various wireless mediums.

The WLAN logical architecture comprises stations (STA), wireless access points (AP), independent basic service sets (IBSS), basic service sets (BSS), distribution systems (DS), and extended service sets (ESS). Some of these components map directly to hardware devices, such as stations and wireless access points. For example wireless access points may function as bridges between stations and a network backbone (e.g., in order to provide network access). An independent basic service set is a wireless network comprising at least two stations. Independent basic service sets are also sometimes referred to as an ad hoc wireless network. Basic service sets are wireless networks comprising a wireless access point supporting one or multiple wireless clients. Basic service sets are also sometimes referred to as infrastructure wireless networks. All stations in a basic service set may interact through the access point. Access points may provide connectivity to wired local area networks and provides bridging functionality when one station initiates communication to another station or with a node in a distribution system (e.g., with a station coupled to another access point that is linked through a wired network backbone).

In wireless network architectures like WLAN, beacon signals may be utilized to synchronize the operation of networked apparatuses. In situations where new ad hoc networks are being created, the initiating apparatus may establish beaconing based on it owns clock, and all apparatuses that join the network may conform to this beacon. Similarly, apparatuses that desire to join an existing wireless network may synchronize to the existing beacon. In the case of WLAN, apparatuses may synchronize to beacon signals utilizing a timing synchronization function (TSF). The timing synchronization function is a clock function that is local to an apparatus that synchronizes to and tracks the beacon period.

An example of a beacon signal is shown in FIG. 5 at 502 wherein a target beacon transmission time (TBTT) indicates the targeted beacon transmission. This time may be deemed "targeted" because the actual beacon transmission may be a somewhat delayed from the TBTT due to, for example, the channel being occupied at TBTT. The apparatuses that are active in the network may communicate with each other in accordance with the beacon period. However, there may be instances where it may not be beneficial, and may possibly even be detrimental, for apparatuses to be active during each beacon period. For example, apparatuses that do not expect frequent communication within the wireless network may not benefit from being active for every beacon period. Moreover, apparatuses with limited power or processing resource may be forced to waste these precious resources by the requirement of being active for every beacon period.

In accordance with at least one example embodiment of the present invention, functionality may be introduced utilizing the example distributed wireless network described above to allow apparatuses to operate at a standard beaconing rate, or alternatively, using a "diluted" beaconing rate. "Diluted" beaconing may entail a beaconing mode operating at a lower frequency than the beaconing rate originally established in the network. Diluted beaconing may be based on information (e.g., information elements) that is included in network beacon frames, wherein the included information may express one or more diluted beacon rates as multiples of the beacon. Using the beacon and the one or more associated diluted beacon period indications contained within beacon frames, networked apparatuses may elect to operate (e.g., via random contention) based either on the beacon or a diluted beacon period. In particular, all apparatuses may synchronize to the same initial target beacon transmission time (TBTT), for example when TSF=0, and may then count the number periods that occur after the initial TBTT based on the internal TSF function. In this way, apparatuses operating using a diluted beacon period may be active on TBTT counts that corresponds to the multiple defined by the diluted beaconing period.

An example diluted beacon rate of every $10^{th}$ TBTT is disclosed in FIG. 5 at 504. The decision on a beaconing rate to utilize may be handled by each apparatus individually, (e.g., in the protocol stacks that manage operation of a radio modem). All apparatuses, however, will operate based on a beacon interval that remains the same for the lifetime of the network. In view of the requirement that the beacon interval remain unchanged for the duration of the wireless network, the diluted beacon signal may be expressed as a multiple of the beacon signal. In the example disclosed in FIG. 5, and as set forth above, the first TBTT is equivalent TSF=0. This initial value is dictated by the apparatus that formed the network. Other apparatuses that subsequently join the network may adopt this beacon interval parameter and TBTT timing. For example, the TBTT at TSF=0 is the "base point" that determines when beacons are transmitted. All the devices in network update their own TSF counters as per legacy synchronization rules, and from the TSF they may determine the particular TBTT in which to participate in beaconing assuming that, regardless of the beaconing rate, the first beacon was transmitted at TSF=0.

For example, in a network with four apparatuses where devices 1, 2 and 4 operate using a diluted beaconing mode having an example frequency (e.g., a time period between beacon transmissions) of every $6^{th}$ TBTT all apparatuses may remain synchronized, but only device 3 would be active (e.g., "competing") in beaconing periods 1, 2, 3, 4 and 5, while all apparatuses may participate in TBTT 0, TBTT 6, TBTT 12, etc. Therefore, there can be at least two different beacon periods among the apparatuses, and possibly further diluted beacon periods as each apparatus may select its own diluted beaconing period based on the original beaconing period and the one or more associated diluted beacon period indications transmitted therewith.

In accordance with at least one example embodiment of the present invention, beacons will contain a diluted beacon period parameter. The diluted beacon period parameter may, for example, be carried in vendor-specific information elements (IEs). Diluted beacon period parameter values may remain the same for the lifetime of the network. However, should there be need for more flexibility, other beacon rate periods may be predefined, and all of the predefined beacon rate periods may signaled in a manner similar to the diluted beaconing rate.

Figure 6:
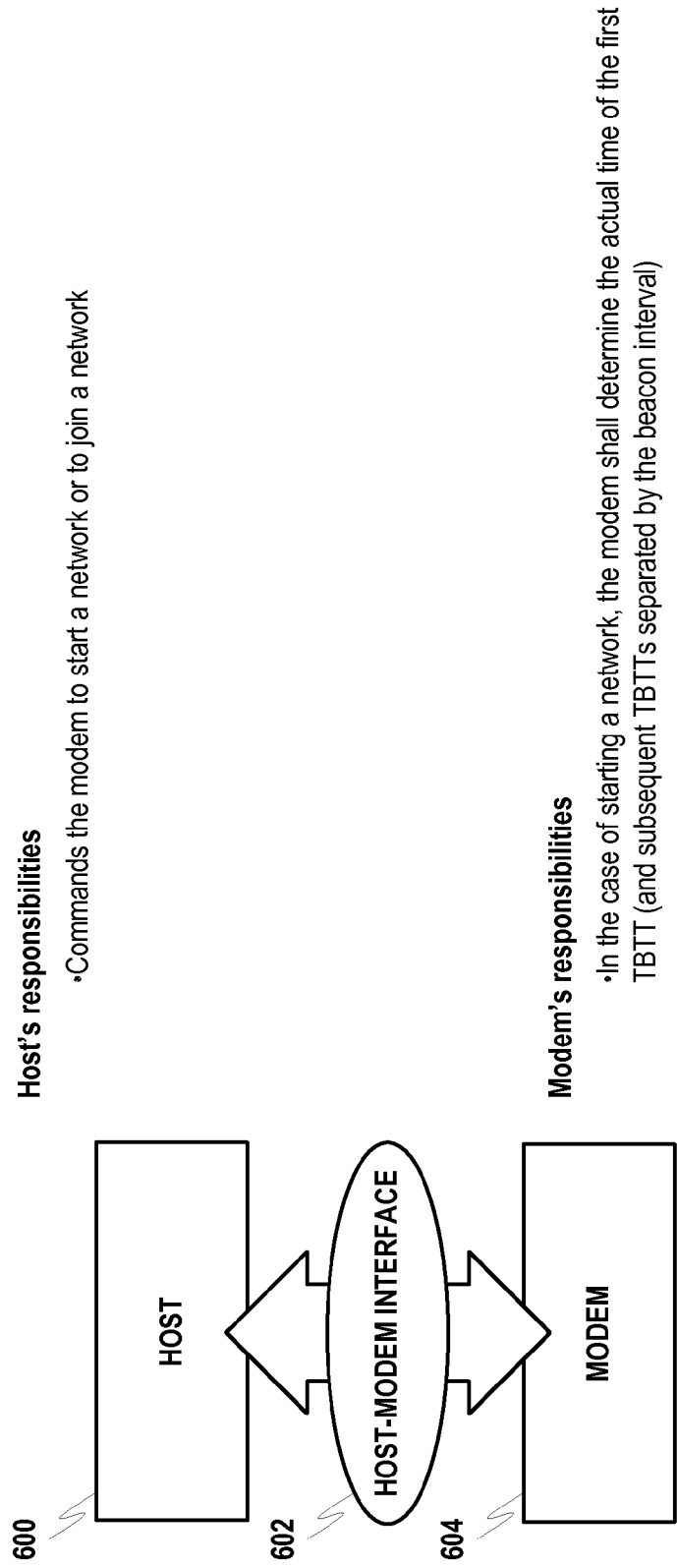
FIG. 6 discloses an example of host responsibilities and modem responsibilities in accordance with at least one example embodiment of the present invention.

FIG. 6 discloses an example of the responsibilities of host 600 (e.g., upper level control layers that reside above a radio modem in apparatuses) and the responsibilities of radio modem 604. The term "radio modem" in this instance may also be considered to encompass more complex radio "modules" that incorporate additional functionality into the radio modem. For example, host 600 may be responsible for commands instructing a modem to start a network (or to join a network) and the determination of whether to utilize a beacon interval or diluted beacon period given to the modem. Host 600 may further be responsible for post-processing related to received beacons, the formation of beacons for transmission by the radio modem (e.g., when an apparatus is establishing a new network), communicating with networked apparatuses using host-level protocols (e.g., that exploit WLAN data type frames). Moreover, beacon rate transition notifications (e.g., beacon rate changes during the life of a network) can be conveyed in both beacons (e.g., vendor-specific information elements) or in host-level protocol messages.

Host-Modem Interface (I/F) 602 can be either a physical interface between two physically separate entities, like a host processor and wireless modem, or a logical (software) interface inside one physical entity, like wireless modem, or may comprise combinations of both.

The responsibilities of radio modem 604 may include, in the instance of network establishment, determining the actual time of the first TBTT (and subsequent TBTTs that are separated in accordance with the beacon interval). Further radio modem 604 may count the number TBTTs that have occurred, and may participate in beaconing for every TBTT (e.g., standard beaconing) or every Nth multiple of the TBTT (e.g., diluted beaconing) in accordance with the configuration defined by host 600, may provide received beacon signals to the host for post-processing and may transmit and receive frames as in standard WLAN ad hoc networking.

Figure 7:
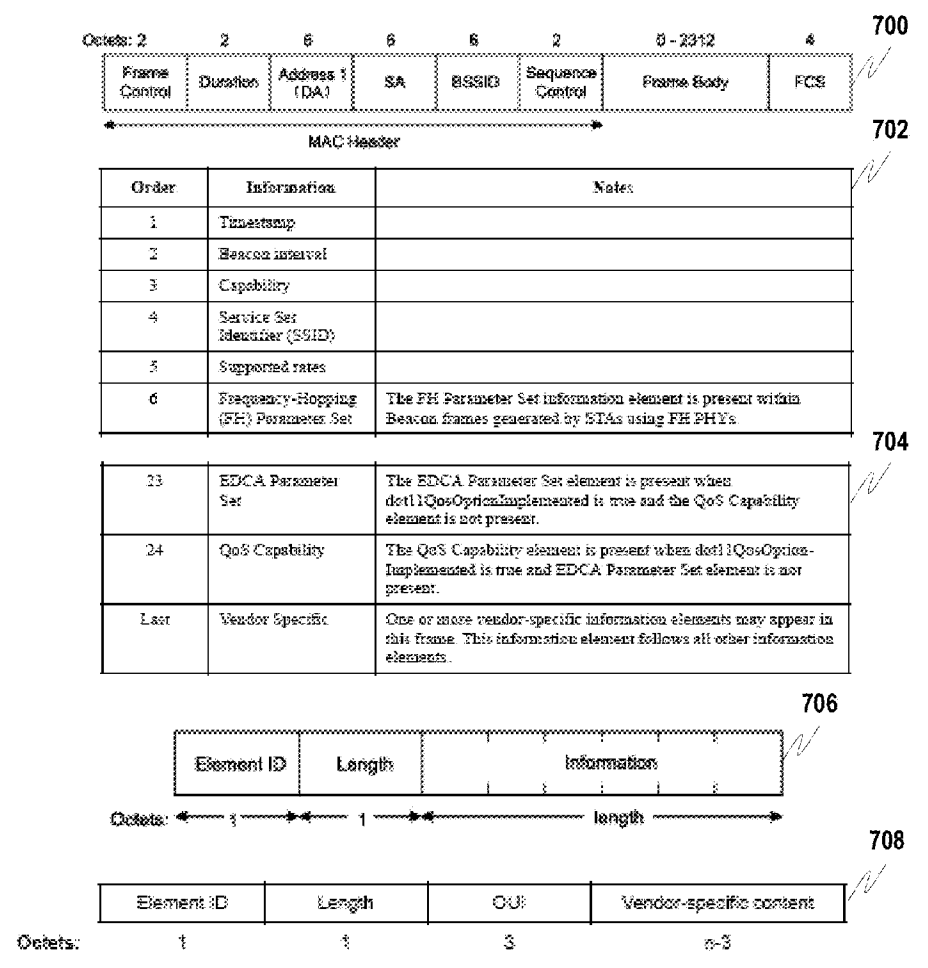

Various example implementations of the present invention may utilize "standard" beacon frame formats, such as disclosed at 700 in FIG. 7. The body of beacon frames contains a sequence of information fields that may, for example, be dedicated for fixed format fields (e.g., fields that are always fixed in the same position of the frame), or information elements (IEs) that may be the formatted as disclosed at 702 and 704. Beacon interval is a dedicated fixed field that is used to indicate the number of time units between TBTTs (e.g., as in the standard WLAN).

Beacons may also utilize vendor-specific information elements to indicate diluted beacon period values. Per the example disclosed at 706, the first three octets of the information field may contain an organizationally unique identifier (OUI) corresponding to manufacturers, vendors, service-providers, etc. This OUI may further define the content of a particular vendor specific information element. The OUI field may be publicly available information that is assigned by an organization like the Institute of Electrical and Electronics Engineers (IEEE). Such as in the example disclosed at 708, a diluted beacon period can be associated with its own OUI, or the OUI may correspond to, for example, a device vendor or service provider specific OUI and indication of diluted beacon period parameter is in the vendor-specific content.

A flowchart of an example communication process in accordance with at least one example embodiment of the present invention is now described with respect to FIG. 8. In step 800 links between apparatuses may be created, for example, when apparatuses enter into a particular area (e.g., an operational space) that contains other wireless-enabled apparatuses. Linking may comprise the establishment of new networks, or alternatively, apparatuses joining existing networks. In situations where new networks need to be established (e.g., as determined in step 802) at least one apparatus may enter a new network creation mode in step 804. The new network creation mode may comprise beacon transmission wherein, in accordance with at least one embodiment of the present invention, beacon frames may comprise a timing signal and one or more associated diluted beacon indications. Apparatuses may then participate in the network based on a particular operational mode (in this example as beaconing apparatus) in step 806 until the network is discontinued as determined in step 808. The process may then return to step 800 to await further requirements for link establishment.

If an existing network to which membership is desired is determined in step 802, then apparatus desiring network membership may attempt to synchronize to the network beacon in step 810. For example, an attempt may be made to synchronize the clock provided by the timing synchronization function to the beacon. The timing synchronization function allows network apparatuses to track the beacon signal and keep synchronized with the other apparatuses in the network. Upon synchronization, as determined in step 812, control entities (e.g., host 600) in devices that desire network membership may then determine an operational mode in step 814.

The criteria for selecting operational mode may be determined in view of, for example, the activity in an apparatus that necessitated the communication, current apparatus operating condition, the abilities/functionality of apparatuses, etc. Once a mode has been selected from the available operational modes defined by, for example, a timing signal, an associated beacon period indication and/or one or more associated diluted beacon period indications (all of which may be transmitted in beacon frames), the process may proceed to step 806 wherein the apparatus may participate in the network in accordance with the selected operational mode. In accordance with various embodiments of the present invention, the apparatus may participate in the network (e.g., contention) based on, for example, a multiple of the beacon period that is defined by the beaconing mode. The operational mode selected in apparatuses may also be known by other apparatuses, for example, through messages that contain predefined information elements (IEs) created for this purpose. Participation in the network may continue in step 806 until the network is discontinued in step 808. The process may then return to step 800 to await the next requirement for link establishment.

If synchronization is not successful in step 812, apparatuses that desire to join an existing network may continue to attempt synchronization with the existing beacon in step 810 until a threshold condition is met (as determined in step 816). Possible threshold conditions may comprise, for example, a duration of time without successful beacon synchronization (e.g., a timeout), a number of unsuccessful synchronization attempts, etc. Once the threshold condition has been determined to be met in step 816, the process may proceed to step 818 wherein a decision is made that the existing network is not available. The process may then return to step 802 and follow the process flow pertaining to new network creation (e.g., steps 802-808).

Further to the above, the various example embodiments of the present invention are not strictly limited to the above implementations, and thus, other configurations are possible.

For example, apparatuses in accordance with at least one embodiment of the present invention may comprise means for receiving a beacon frame comprising a timing signal, an associated beacon period indication and an associated diluted beacon period indication corresponding to a wireless network, means for synchronizing a timing signal function to the received beacon timing signal, and means for determining a mode of operation based on the timing signal function, the beacon period indication and the diluted beacon period indication.

Another example apparatus in accordance with at least one embodiment of the present invention may comprise means for initiating a wireless network, and means for transmitting one or more beacon frames, the beacon frames including a timing signal, an associated beacon period indication and an associated diluted beacon period indication corresponding to the wireless network.

Accordingly, it will be apparent to persons skilled in the relevant art that various changes in form a and detail can be made therein without departing from the spirit and scope of the invention. The breadth and scope of the present invention should not be limited by any of the above-described exemplary embodiments, but should be defined only in accordance with the following claims and their equivalents.

What is claimed:

1. A method, comprising:
    receiving a beacon frame at an apparatus, the received beacon frame comprising a timing signal, an associated target beacon transmission time period indication that is associated with a standard beacon period and an associated diluted beacon period indication that is associated with a diluted beacon period corresponding to a wireless ad hoc network, the diluted beacon period having a lower frequency than a frequency of the standard beacon period;
    synchronizing at the apparatus, a timing signal function to the received beacon timing signal of the ad hoc network;
    determining, by the apparatus, whether the apparatus operates with the standard beacon period or the diluted beacon period indicated in the received beacon frame; and
    preparing at the apparatus, for transmission of a beacon frame in the ad hoc network according to a time period after the received beacon frame, the time period being selected by the apparatus based on the determination by the apparatus whether the apparatus operates with the standard beacon period or the diluted beacon period, the time period being based on the diluted beacon period indication of the received beacon frame, the beacon frame to be transmitted including the target beacon transmission time indication and the associated diluted beacon period indication.

2. The method of claim 1, wherein the associated diluted beacon period indication is communicated in the beacon frame in a predefined information element.

3. The method of claim 1, wherein the associated diluted beacon period is a beaconing mode operating at a lower frequency than a standard beacon period.

4. The method of claim 1, wherein determining a mode of operation based on the timing signal function, the associated standard beacon period indication and the associated diluted beacon period indication, comprises selecting whether to be active in the network according to the timing signal or the diluted beacon period.

5. The method of claim 4, wherein being active in the network comprises contending for access to a wireless communication medium with other networked apparatuses.

6. The method of claim 1, further comprising communicating a determined mode of operation to other networked apparatuses.

7. A method, comprising:
    entering an apparatus to a new wireless ad hoc network creation mode;
    transmitting at the apparatus, one or more beacon frames, the beacon frames including a timing signal, an associated target beacon transmission time period indication that is associated with a standard beacon period and an associated diluted beacon period indication that is associated with a diluted beacon period corresponding to the wireless ad hoc network, the diluted beacon period having a lower frequency than a frequency of the standard beacon period; and
    receiving at the apparatus, a beacon frame from a wireless communication device in the ad hoc network, according to a time period after the transmitted one or more beacon frames, the time period being selected by the wireless communication device based on a determination by the wireless communication device whether the wireless communication device operates with the standard beacon period or the diluted beacon period indicated in the transmitted one or more beacon frames, the time period being based on the diluted beacon period indication of the transmitted one or more beacon frames, the received beacon frame including the target beacon transmission time indication and the associated diluted beacon period indication.

8. The method of claim 7, wherein the associated diluted beacon period is a beaconing mode operating at a lower frequency than the standard beacon period.

9. A computer program product comprising computer executable program code recorded on a computer readable non-transient medium, comprising:
    computer program code configured to receive at an apparatus, a beacon frame comprising a timing signal, an associated target beacon transmission time period indication that is associated with a standard beacon period and an associated diluted beacon period indication that is associated with a diluted beacon period corresponding to a wireless ad hoc network, the diluted beacon period having a lower frequency than a frequency of the standard beacon period;

computer program code configured to synchronize at the apparatus, a timing signal function to the received beacon timing signal of the ad hoc network;

computer program code configured to determine, by the apparatus, whether the apparatus operates with the standard beacon period or the diluted beacon period indicated in the received beacon frame; and computer program code configured to prepare at the apparatus, for transmission of a beacon frame in the ad hoc network according to a time period after the received beacon frame, the time period being selected by the apparatus based on the determination by the apparatus whether the apparatus operates with the standard beacon period or the diluted beacon period, the time period being based on the diluted beacon period indication of the received beacon frame, the beacon frame to be transmitted including the target beacon transmission time indication and the associated diluted beacon period indication.

10. The computer program product of claim 9, wherein the associated diluted beacon period indication is communicated in the beacon frame in a predefined information element.

11. The computer program product of claim 9, wherein the associated diluted beacon period is longer than the standard beacon period.

12. A computer program product comprising computer executable program code recorded on a computer readable non-transient medium, comprising:

computer program code configured to enter an apparatus to a new wireless ad hoc network creation mode;

computer program code configured to transmit at the apparatus, one or more beacon frames, the beacon frames including a timing signal, an associated target beacon transmission time period indication that is associated with a standard beacon period and an associated diluted beacon period indication that is associated with a diluted beacon period corresponding to the wireless ad hoc network, the diluted beacon period having a lower frequency than a frequency of the standard beacon period; and computer program code configured to receive at the apparatus, a beacon frame from a wireless communication device in the ad hoc network, according to a time period after the transmitted one or more beacon frames, the time period being selected by the wireless communication device based on a determination by the wireless communication device whether the wireless communication device operates with the standard beacon period or the diluted beacon period indicated in the transmitted one or more beacon frames, the time period being based on the diluted beacon period indication of the transmitted one or more beacon frames, the received beacon frame including the target beacon transmission time indication and the associated diluted beacon period indication.

13. The computer program product of claim 12, wherein the associated diluted beacon period is a beaconing mode operating at a lower frequency than the standard beacon period.

14. An apparatus, comprising:
a processor;
a memory including computer program code;
the memory and the computer program code configured to, with the processor, cause the apparatus at least to:

receive a beacon frame comprising a timing signal, an associated target beacon transmission time period indication that is associated with a standard beacon period and an associated diluted beacon period indication that is associated with a diluted beacon period, corresponding to a wireless ad hoc network, the diluted beacon period having a lower frequency than a frequency of the standard beacon period;

synchronize a timing signal function to the received beacon timing signal of the ad hoc network;

determine whether the apparatus operates with the standard beacon period or the diluted beacon period indicated in the received beacon frame; and prepare for transmission of a beacon frame in the ad hoc network according to a time period after the received beacon frame, the time period being selected by the apparatus based on the determination by the apparatus whether the apparatus operates with the standard beacon period or the diluted beacon period, the time period being based on the diluted beacon period indication of the received beacon frame, the beacon frame to be transmitted including the target beacon transmission time indication and the associated diluted beacon period indication.

15. The apparatus of claim 14, wherein the associated diluted beacon period indication is communicated in the beacon frame in a predefined information element.

16. The apparatus of claim 14, wherein the associated diluted beacon period is a beaconing mode operating at a lower frequency than the standard beacon period.

17. The apparatus of claim 14, wherein determining a mode of operation based on the timing signal function, the standard beacon period indication and the diluted beacon period indication comprises selecting whether to be active in the network according to the timing signal or the diluted beacon period.

18. The apparatus of claim 17, wherein being active in the network comprises contending for access to a wireless communication medium with other networked apparatuses.

19. The apparatus of claim 14, further comprising communicating the determined mode of operation to other networked apparatuses.

20. An apparatus, comprising:
a processor;
a memory including computer program code;
the memory and the computer program code configured to, with the processor, cause the apparatus at least to:

enter an apparatus to a new wireless ad hoc network creation mode;

transmit one or more beacon frames, the beacon frames including a timing signal, an associated target beacon transmission time period indication that is associated with a standard beacon period and an associated diluted beacon period indication that is associated with a diluted beacon period corresponding to the wireless ad hoc network, the diluted beacon period having a lower frequency than a frequency of the standard beacon period; and receive a beacon frame from a wireless communication device in the ad hoc network, according to a time period after the transmitted one or more beacon frames, the time period being selected by the wireless communication device based on a determination by the wireless communication device whether the wireless communication device operates with the standard beacon period or the diluted beacon period indicated in the transmitted one or more beacon frames, the time period being based on the diluted beacon period indication of the transmitted one or more beacon frames, the received beacon frame including the target beacon transmission time indication and the associated diluted beacon period indication.

21. The apparatus of claim 20, wherein the associated diluted beacon period is a beaconing mode operating at a lower frequency than the standard beacon period.

* * * * *